United States Patent [19]

Glesias

[11] Patent Number: 5,100,934
[45] Date of Patent: Mar. 31, 1992

[54] HEATSET INTAGLIO PRINTING INK

[75] Inventor: Walter J. Glesias, Elmwood Park, N.J.

[73] Assignee: Sun Chemical Corporation, Fort Lee, N.J.

[21] Appl. No.: 694,191

[22] Filed: Apr. 30, 1991

[51] Int. Cl.$^5$ ................................................ C08K 5/00
[52] U.S. Cl. .................................... 523/456; 523/427; 106/20
[58] Field of Search ............................ 106/23, 30, 31; 523/456

[56] References Cited

U.S. PATENT DOCUMENTS 4,166,154  8/1979  Meeske et al. ............. 260/23 EP
4,966,628 10/1990  Amon et al. ................. 106/30

Primary Examiner—William R. Dixon, Jr.
Assistant Examiner—Margaret V. Einsmann
Attorney, Agent, or Firm—Jack Matalon

[57] ABSTRACT

The invention relates to a heatset printing ink for the printing of documents by the method of engraved steel die printing. The ink is formulated from (i) an epoxy resin, (ii) an epoxy resin ester reacted with a mixture of one or more unsaturated monobasic acids and one or more reactive monomers, or a mixture of (i) and (ii), together with one or more pigments, a glycol or glycol ether solvent, a drier and an amine curing agent. The ink is especially useful for the printing of security documents, particularly currency.

14 Claims, No Drawings

HEATSET INTAGLIO PRINTING INK

FIELD OF THE INVENTION

The invention relates to a heatset printing ink for the printing of documents by intaglio printing, i.e, engraved steel die printing. The ink has been found to be especially useful for the printing of security documents such as stamps, checks, stock certificates, bank notes, tickets, etc.; the printing ink of the present invention is particularly suited for use as a currency ink.

BACKGROUND OF THE INVENTION

The current process for printing security documents, especially currency, is sheetfed intaglio. Sheetfed intaglio inks are based on oxidizable resins and alkyds and are very slow drying. Typically, one side of the currency is printed first and after 24–48 hours, the other side is printed. The typical printing speed of sheetfed intaglio is about 45–75 m/min. U.S. Pat. No. 4,966,628 discloses typical sheetfed intaglio inks suitable for printing of security documents.

The term "intaglio printing" refers to a printing process wherein a printing cylinder or printing plate carries the engraved pattern and the engraved recess is filled with printing ink to be transferred to the printing substrate in order to create the document. In this type of printing, typically a rotating engraved cylinder (usually manufactured from steel or nickel and plated with chromium) is supplied with ink by one or more template inking cylinders by which a pattern of inks of different color is transferred to the printing cylinder. Any excess of ink on the surface of the cylinder is then wiped off by a rotating wiper cylinder covered by a plastisol, using a dilute aqueous solution of sodium hydroxide as an emulsifying medium for the wiped-off excess ink. Thereafter, the printing pattern is transferred, under a pressure of up to 27 kg/mm², to the substrate. The principal requirements for a security document heatset intaglio printing ink are as follows:

(a) correct rheological properties in respect to transfer of the ink to the printing cylinder and transfer therefrom to the substrate;

(b) ability of the excess ink to be easily and quantitatively removed from the non-image areas of the die surface by the wiping cylinder (wipeability);

(c) ease of cleaning the wiping cylinder by means of a dilute aqueous caustic soda solution containing about 1% of NaOH and 1% sulfonated castor oil;

(d) stability of the ink on the printing rollers; i.e. control of the evaporation of volatile materials during the printing process;

(e) film-forming characteristics allowing handling of the webs carrying printed films of up to 200μ thickness immediately after printing, (f) proper drying properties when printing at speeds of up to 200m/min. with engravings of up to 200μ thickness;

(g) outstanding chemical and mechanical resistance of the printed document pursuant to specifications established by INTERPOL at the 5th International Conference on Currency and Counterfeiting in 1969 and by the U.S. Bureau of Engraving and Printing in BEP 88-214 (TN) §M5.

All of the foregoing requirements have been met by the ink compositions of the present invention. Indeed, the ink compositions of the present invention have been accepted by the Bureau of Engraving and Printing for use in printing currency by heatset intaglio printing.

DETAILS OF THE INVENTION

The heatset intaglio printing inks of the present invention comprise:

A. a resin selected from the group consisting of: (i) an epoxy resin comprising the condensation product of bisphenol A and epichlorohydrin and represented by the formula wherein n=0 to 15:

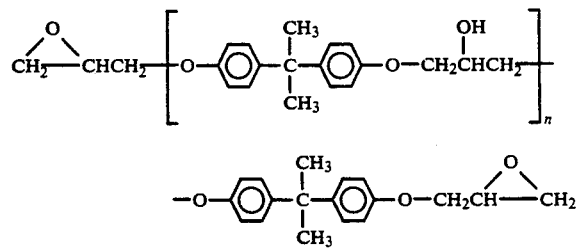

(ii) the reaction product of: (a) the ester obtained from the esterification of the epoxy resin of (i) with a drying oil fatty acid and (b) a mixture of 20–28% of one or more unsaturated monobasic acids having a polymerizable double bond and 80–72% of one or more reactive monomers having a polymerizable double bond; and
(iii) mixtures of (i) and (ii);

B. at least one glycol and/or glycol ether;
C. at least one pigment;
D. at least one drier; and
E. at least one amine curing agent.

The preferred epoxy resin of (i) is one which is exemplified by Shell Epon ® Resin 1009F in which n has an approximate value of 13, the epoxide equivalent weight ranges between 2300 and 3800 and (½the viscosity is 36–98 poises (ASTM D-445). Such epoxy resins are well known in the prior art and are commercially available from several sources.

Resin (ii) is prepared by first esterifying resin (i) with a drying oil fatty acid, preferably one which has an acid number of 190–200 and an iodine value between 125 and 185 and preferably having at least 20% of its double bonds present in a conjugated configuration. Especially useful are those fatty acids derived from oils such as safflower oil, sunflower oil, tung oil, canola oil, tall oil, soya bean oil, dehydrated castor oil, oiticica oil, plukenetia oil, hemp-seed oil, perilla oil, walnut oil, tobacco seed oil and linseed oil.

For the purposes of preparing resin (ii), it is preferred that epoxy resin (i) obtained by condensing bisphenol A and epichlorohydrin be one which has an epoxide equivalent value of 450–525, a melting point of 65°–75° C. and a Gardner-Holdt viscosity of E-J in a test solution at 40% non-volatile in diethylene glycol monobutyl ether. Such epoxy resins are well-known and are commercially available(e.g. Shell Chemical Epon ® 1001). Typically, the esterification is carried out at a temperature of about 220°–240° C. and continued until an acid number below 10.0 is obtained the ester is then dissolved in a glycol ether such as ethylene glycol monobutyl ether to a concentration of 60% non-volatile and a Gardner-Holdt viscosity of K-N.

The 60% non-volatile solution of the esterified epoxy resin is thereafter reacted with a mixture of 20–28% of one or more unsaturated monobasic acids having a polymerizable double bond and 80-72% of one or more reactive monomers having a polymerizable double bond. Suitable monobasic acids include acrylic acid, methacrylic acid, crotonic acid and vinylacetic acid. Suitable reactive monomers include styrene, vinyl toluene and the acrylic and methacrylic acid esters of $C_1$-$C_{10}$ alcohols such as methyl, ethyl, propyl, isopropyl butyl, isobutyl and 2-ethyl hexyl alcohol.

The ratio of esterified epoxy resin to the mixture of unsaturated monobasic acids and reactive monomers is preferably about 60:40. The reaction between the esterified epoxy resin and such mixture is typically carried out at a temperature of about 120 to 150° C. in the presence of about 1.6 wt % of a peroxide catalyst such as ditertiary butyl peroxide, benzoyl peroxide, cumene peroxide, tertiary butyl perbenzoate, tertiary butyl hydroperoxide, and the like. The resultant solution is then typically neutralized with an amine to a pH of about 5 to 9 to make it water dilutable.

Resins of the type of resin (ii) are well known and may be prepared in accordance with the teachings of U.S. Pat. No. 4,166,504 to Charles J. Meeske, et al. and assigned to Reichold Chemicals, Inc., and incorporated herein by reference. These resins are commercially available, a useful example of resin (ii) is Reichold Chemicals Epotuf® Epoxy Ester Resin 92-737 dissolved in diethylene glycol monobutyl ether and hereinafter referred to as "Varnish 90-164". This varnish contains 70% non-volatiles, has an acid number of 58 and a Gardner-Holdt viscosity of $Z_6$-$Z_7$, and corresponds to Example VIII of U.S. Pat. No. 4,166,504.

The resin component is generally present in the ink in an amount of about 20-40 wt. %, based on the weight of the finished ink. For the purposes of the present invention, the particularly preferred resin component is a mixture of resins (i) and (ii); the ratio of resin (i) to resin (ii) will generally be in the range of about 1:1 to 1:3.

The printing ink composition includes at least one glycol and/or glycol ether which acts as a solvent for the resin. The glycol and/or glycol ether will generally have a boiling point of 200°-250° C., preferably 220°-235° C. and will be present in an amount of about 5 to 30 wt. %, based on the weight of the finished ink. Suitable glycols and glycol ethers include ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether and propylene glycol monophenyl ether, and mixtures thereof.

The pigment may be any desired inorganic and/or organic pigment suitable for heatset intaglio printing and will generally be present in an amount of about 5 to 40, preferably 10 to 30, wt. %, based on the weight of the finished ink. For the printing of security documents, especially currency, the preferred pigments are black iron oxide, yellow iron oxide, carbon black, Pigment Green 7, Pigment Green 36, Pigment Blue 15, Pigment Red 146, Pigment Red 224 and mixtures thereof.

The inks of the present invention will contain one or more driers, present in a total amount of about 0.5 to 5 wt. %, based on the weight of the finished ink. Suitable driers are the heavy metal salts of complex fatty acids, present singly or as mixtures. Examples of useful driers are the octoates, resinates, naphthenates, neodecanoates, tallates and linoleates and mixtures thereof of metals such as cobalt, magnesium, cerium, zirconium and mixtures thereof. If desired, a small amount, e.g. 0.1-1.0 wt. %, of a drier activator may be included in order to enhance the activity of the drier; a suitable drier activator is 2,2'-bipyridyl.

The amine curing agent is present in an amount of about 1 to 5 wt. %, based on the weight of the finished ink. Preferably the amine curing agent is a diamine such as ethylenediamine, diethylenetriamine, triethylenetetramine, tetraethylenepentamine, pentaethylenehexamine, hexaethyleneheptamine, dimethylaminopropylamine and mixtures thereof.

Preferably, the ink will contain one or more fillers in an amount of about 1 to 35 wt. %, based on the weight of the finished ink. Suitable fillers include china clay, calcium carbonate, calcium sulfate, talc, silica, titanium dioxide, alumina and mixtures thereof. The ink may also contain about 1 to 5 wt. %, based on the weight of the finished ink, of a wax to improve scuff resistance. Suitable waxes include polytetrafluoroethylene waxes, polyethylene waxes and mixtures thereof.

The finished ink will typically have a viscosity in the range of 90 to 250 poises and may be printed at speeds of 100-200 m/min. The inks dry rapidly—typically the imprinted substrate will be cured in ovens of 5-6 meters in length at temperatures of 180° to 280° C. and a residence time of 0.1 to 2 seconds. Thus a second color may be printed almost instantaneously upon a previously-printed color; in a similar vein, the blank side of currency may be printed an instant after printing the other side. Moreover, the ink has been accepted by the Bureau of Engraving and Printing as a currency ink for heatset intaglio printing. Such acceptance is based on test procedures and requirements used to evaluate the ability of notes to withstand soiling and abuse which may be encountered during circulation. Tests of the notes include the following:

(a) chemical resistance to solvents, acids, alkalies, soaps and detergents;
(b) ink film integrity rub test;
(c) crumple test
(d) laundering test
(e) soiling test
(f) humidity and temperature stability
(g) flexing test
(h) fade resistance test
(i) magnetic properties test The following examples shall serve to illustrate the invention. Unless otherwise indicated, all parts and percentages are by weight.

EXAMPLE 1

Two formulations, A and B, were prepared from the components set forth in Table I below. Laboratory tests showed that formulation A had excellent resistance to solvents such as toluene, acetone, etc. while formulation B exhibited only fair resistance to solvents. On the other hand, formulation B exhibited better properties in respect to the laundry and flexibility tests and acceptable resistance to solvents 5-7 days after drying.

TABLE I

| Component | A | B |
|---|---|---|
| Varnish 90-164 | 23.1 | 31.1 |
| Epon ® 1009F in 50% ethylene glycol monobutyl ether | 23.0 | 15.0 |

TABLE I-continued

| Component | A | B |
| --- | --- | --- |
| Cobalt Octoate Drier | 0.4 | 0.4 |
| Manganese Octoate Drier | 0.4 | 0.4 |
| 2,2'-Bipyridyl Drier Activator | 0.2 | 0.2 |
| Pigment and filler and waxes | 29.7 | 29.7 |
| Diethylenetriamine curing agent | 2.0 | 2.40 |
| Ethylene glycol monobutyl ether | 21.2 | 21.2 |

EXAMPLE 2

Three ink formulations, black B, Green C and Green D were prepared from the components indicated in Table II. The black formulation was tested as a currency ink for the face of U.S. currency, while each green formulation was tested for the back of the currency. The currency was printed by heatset intaglio at the rate of 135 m/min., with the obverse side (i.e. the green side) of the currency being printed first. After printing of the green side, the web passed through a two-zone drying oven about 5 m in length; the temperature of the oven at the entrance zone was 260°-265° C., while the temperature of the exit zone was at 190°-205° C., and the temperature of the web as it exited the drying oven was 160°-177° C. After exiting the first oven, the face of the currency was printed with the black ink and the web then passed through a second tow-zone drying oven of the same dimensions and temperatures. The currency was then exposed to the tests indicated in subparagraphs (a)-(i). It was determined that the inks passed all of these tests and the Bureau of Engraving and Printing accepted these inks for use in its new heatset intaglio printer.

TABLE II

| Component | Black C | Green D | Green E |
| --- | --- | --- | --- |
| Varnish 90-164 | 42.50 | 40.50 | 42.10 |
| Silicone | 0.50 | 0.00 | 0.00 |
| Black Iron Oxide | 30.80 | 11.00 | 10.83 |
| Yellow Iron Oxide | 0.00 | 20.00 | 19.67 |
| Furnace Carbon Black | 1.40 | 0.00 | 0.00 |
| Pigment Green 7 | 0.00 | 4.00 | 3.90 |
| Pigment Blue 27 | 0.00 | 0.00 | 1.20 |
| Polytetrafluoroethylene Wax | 2.00 | 2.00 | 2.00 |
| Silica | 4.90 | 2.00 | 2.00 |
| Cobalt Octoate | 0.40 | 0.45 | 0.44 |
| Manganese Octoate | 0.40 | 0.45 | 0.44 |
| 2,2'-Bipyridyl Drier Activator | 0.20 | 0.30 | 0.30 |
| Diethylenetriamine curing agent | 2.00 | 2.00 | 2.00 |
| Ethylene glycol monobutyl ether | 15.00 | 17.30 | 15.12 |

EXAMPLE 3

Two ink formulations, Green F and Green G, were prepared from the components indicated in Table III. These ink formulations passed the currency ink tests in the laboratory and have been submitted to the Bureau of Engraving and Printing for evaluation. It is anticipated that the Bureau will approve these ink formulations for use as currency inks in connection with its new heatset intaglio printer.

TABLE III

| Component | Green F | Green G |
| --- | --- | --- |
| Varnish 90-164 | 37.50 | 36.0 |
| HR Yellow Pigment | — | 11.0 |
| Furnace Carbon Black | 0.90 | 0.70 |
| Pigment Green 7 | 1.80 | 2.80 |
| Pigment Blue 27 | 0.60 | — |
| Titanium Dioxide (White) | 6.50 | 1.50 |
| Polytetrafluoroethylene Wax | 2.00 | 2.00 |

TABLE III-continued

| Component | Green F | Green G |
| --- | --- | --- |
| Silica | 4.50 | 4.50 |
| Calcium Carbonate | 24.00 | 21.00 |
| Cobalt Octoate | 0.40 | 0.40 |
| Manganese Octoate | 0.40 | 0.40 |
| 2,2'-Bipyridyl Drier Activator | 0.20 | 0.20 |
| Diethylenetriamine curing agent | 2.00 | 2.00 |
| Ethylene glycol monobutyl ether | 18.00 | 17.50 |

What is claimed is:

1. A heatset printing ink for the printing of documents by the method of engraved steel die printing comprising:

A. a resin selected from the group consisting of: (i) an epoxy resin comprising the condensation product of bisphenol A and epichlorohydrin and represented by the formula wherein n=0 to 15

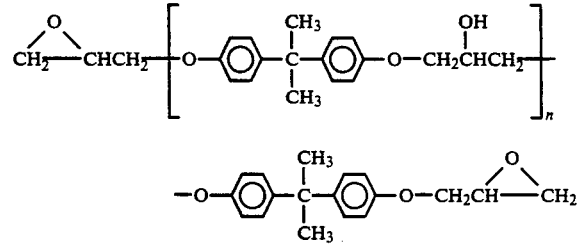

(ii) the reaction product of: (a) the ester obtained from the esterification of the epoxy resin of (i) with a drying oil fatty acid and (b) a mixture of 20-28% of one or more unsaturated monobasic acids having a polymerizable double bond and 80-72% of one or more reactive monomers having a polymerizable double bond; and (iii) mixtures of (i) and (ii);

B. at least one glycol or glycol ether;
C. at least one pigment;
D. at least one drier; and
E. at least one amine curing agent.

2. The ink of claim 1 wherein the resin is present in an amount of about 20 to 40 wt. % and comprises a mixture of (i) and (ii).

3. The ink of claim 2 wherein the ratio of epoxy resin (i) to reaction product (ii) is in the range of about 1:1 to 1:3.

4. The ink of claim 1 wherein epoxy resin (i) has an epoxide equivalent weight of about 2300 to 3800, and a viscosity of about 36-98 poises and n has an approximate average value of 13.

5. The ink of claim 1 wherein the drying oil fatty acid is derived from oils selected from the group consisting of safflower oil, sunflower oil, tung oil, canola oil, tall oil, dehydrated castor oil, soya bean oil, oiticica oil, plukenetia oil, perilla oil, hemp-seed oil, walnut oil, tobacco seed oil and linseed oil.

6. The ink of claim 1 wherein the unsaturated monobasic acids are selected from the group consisting of acrylic acid, methacrylic acid and crotonic acid.

7. The ink of claim 1 wherein the reactive monomer is selected from the group consisting of styrene, vinyl toluene and the acrylic and methacrylic acid esters of alcohols selected from the group consisting of methyl, ethyl, propyl, isopropyl, butyl, isobutyl and 2-ethyl hexyl alcohol.

8. The ink of claim 1 wherein the glycol or glycol ether is present in amount of about 5 to 30 wt. % and is selected from the group consisting of ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether and propylene glycol monophenyl ether, and mixtures thereof.

9. The ink of claim 1 wherein the pigment is present in an amount of about 5 to 40 wt. % and is selected from the group consisting of black iron oxide, yellow iron oxide, carbon black, Pigment Green 7, Pigment Green 36, Pigment Blue 15, Pigment Red 146, Pigment Red 224 and mixtures thereof.

10. The ink of claim 1 wherein the drier is present in an amount of about 0.5 to 5 wt. % and is selected from the group consisting of octoates, resinates, naphthenates, neodecanoates, tallates and linoleates and mixtures thereof of a metal selected from the group consisting of cobalt, magnesium, cerium, zirconium and mixtures thereof.

11. The ink of claim 1 including a drier activator comprising 2,2'-bipyridyl.

12. The ink of claim 1 wherein the amine curing agent is present in an amount of about 1 to 5 wt. % and is selected from the group consisting of ethylenediamine, diethylenetriamine, triethylenetetramine, tetraethylenepentamine, pentaethylenehexamine, hexaethyleneheptamine, dimethylaminopropylamine and mixtures thereof.

13. The ink of claim 1 including a filler present in an amount of about 1 to 35 wt. % and selected from the group consisting of china clay, calcium carbonate, calcium sulfate, talc, silica, titanium dioxide, alumina and mixtures thereof.

14. The ink of claim 1 including a wax present in an amount of about 1 to 5 wt. % and selected from the group consisting of polytetrafluoroethylene waxes, polyethylene waxes and mixtures thereof.

* * * * *